(12) United States Patent
Zhang (10) Patent No.: US 11,777,535 B2
(45) Date of Patent: Oct. 3, 2023

(54) RADIO FREQUENCY CIRCUIT AND TERMINAL DEVICE

(71) Applicant: VIVO MOBILE COMMUNICATION CO., LTD., Guangdong (CN)

(72) Inventor: Sha Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 45 days.

(21) Appl. No.: 17/570,089

(22) Filed: Jan. 6, 2022

(65) Prior Publication Data
US 2022/0131560 A1 Apr. 28, 2022

Related U.S. Application Data

(63) Continuation of application No. PCT/CN2020/098550, filed on Jun. 28, 2020.

(30) Foreign Application Priority Data

Jul. 8, 2019 (CN) .......................... 201910609903.2

(51) Int. Cl.
*H04B 1/04* (2006.01)
*H04B 1/16* (2006.01)
(Continued)

(52) U.S. Cl.
CPC ......... *H04B 1/0064* (2013.01); *H04B 1/0057* (2013.01); *H04B 1/0483* (2013.01); *H04B 1/1615* (2013.01); *H04B 1/44* (2013.01)

(58) Field of Classification Search
CPC ...... H04B 1/005; H04B 1/0057; H04B 1/006; H04B 1/0064; H04B 1/0483; H04B 1/16;
(Continued)

(56) References Cited

U.S. PATENT DOCUMENTS 8,467,738 B2 * 6/2013 Gorbachov ............ H04B 1/006
455/73
8,971,830 B2 * 3/2015 Hadjichristos ....... H04B 1/0483
455/552.1
(Continued)

FOREIGN PATENT DOCUMENTS

CN 203933607 U 11/2014
CN 105827269 A 8/2016
(Continued)

OTHER PUBLICATIONS

International Search Report and Written Opinion of International Application No. PCT/CN2020/098550 issued by the Chinese Patent Office dated Sep. 16, 2020.
(Continued)

*Primary Examiner* — Quochien B Vuong
(74) *Attorney, Agent, or Firm* — IP & T GROUP LLP (57) ABSTRACT

A radio frequency circuit includes a radio frequency front-end module, a switch module and an antenna module. The radio frequency front-end module includes a radio frequency transceiver and a first processing module connected to the radio frequency transceiver, the antenna module includes an antenna for receiving or transmitting a radio frequency signal, and the first processing module is configured to transmit a signal of a first network and a signal of a second network.

10 Claims, 4 Drawing Sheets

(51) Int. Cl.
*H04B 1/44* (2006.01)
*H04B 1/00* (2006.01)

(58) Field of Classification Search
CPC .......... H04B 1/1615; H04B 1/38; H04B 1/40; H04B 1/44; H04B 1/48
See application file for complete search history.

(56) References Cited

U.S. PATENT DOCUMENTS

| | | | |
|---|---|---|---|
| 9,172,441 B2* | 10/2015 | Granger-Jones | H04B 1/0064 |
| 9,515,615 B2* | 12/2016 | Ichitsubo | H04B 1/006 |
| 2011/0261734 A1 | 10/2011 | Dupuy et al. | |
| 2016/0233895 A1 | 8/2016 | Khlat | |
| 2019/0013790 A1 | 1/2019 | Ayranci et al. | |
| 2021/0250943 A1* | 8/2021 | Rico Alvarino | H04B 7/0404 |
| 2021/0288676 A1 | 9/2021 | Zhang | |

FOREIGN PATENT DOCUMENTS

| | | |
|---|---|---|
| CN | 106849984 A | 6/2017 |
| CN | 107070483 A | 8/2017 |
| CN | 109039345 A | 12/2018 |
| CN | 109274397 A | 1/2019 |
| CN | 110336577 A | 10/2019 |

OTHER PUBLICATIONS

First Office Action of priority application No. CN 201910609903.2 issued by the Chinese Patent Office dated Sep. 18, 2020.

* cited by examiner

FIG. 8

RADIO FREQUENCY CIRCUIT AND TERMINAL DEVICE

CROSS-REFERENCE TO RELATED APPLICATIONS

This application is a Bypass Continuation Application of PCT/CN2020/098550 filed on Jun. 28, 2020, which claims priority to Chinese Patent Application No. 201910609903.2 filed on Jul. 8, 2019, which are incorporated herein by reference in their entirety.

TECHNICAL FIELD

The present disclosure relates to the technical field of communication, and in particular, to a radio frequency circuit and a terminal device.

BACKGROUND

The 5th generation (5G) communication system network will adopt two networking modes in the development and construction process: non-standalone (NSA) and standalone (SA). When the terminal device communicates with a base station under an NSA network, in a case that the terminal device performs communication in a dual connectivity mode of long term evolution (LTE) and 5G new radio (NR), an LTE frequency band and an NR frequency band need to be able to work at the same time.

SUMMARY

According to a first aspect, embodiments of the present disclosure provide a radio frequency circuit, including: a radio frequency front-end module, a switch module and an antenna module, wherein
  the radio frequency front-end module includes: a radio frequency transceiver, and a first processing module connected to the radio frequency transceiver;
  the antenna module includes: an antenna for receiving or transmitting a radio frequency signal;
  a first terminal of the radio frequency transceiver is connected to a first terminal of the first processing module, and a second terminal of the radio frequency transceiver is connected to a second terminal of the first processing module;
  a third terminal of the first processing module is connected to a first terminal of the switch module;
  a second terminal of the switch module is connected to the antenna module;
  the first terminal of the radio frequency transceiver is configured to transmit a signal of a first network;
  the second terminal of the radio frequency transceiver is configured to transmit a signal of a second network; and
  the first processing module is configured to transmit the signal of the first network and/or the signal of the second network.

According to a second aspect, embodiments of the present disclosure further provide a terminal device. The terminal device includes the radio frequency circuit as described in the first aspect.

BRIEF DESCRIPTION OF THE DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "and/or" in this specification describes only an association relationship for describing associated objects and represents that three relationships may exist. For example, A and/or B may represent the following three cases: only A exists, both A and B exist, and only B exists.

It is necessary for the terminal device to switch a transmitting antenna at the LTE frequency band for optimizing the signal quality during LTE frequency band signaling connection, and it is necessary for the terminal device to perform SRS antenna switching of the NR frequency band to enable the base station to know the channel quality of the antenna of the terminal device, so it is also necessary for the terminal device to switch the transmitting antenna during SRS antenna switching. In the process of switching the transmitting antenna between the LTE frequency band and the NR frequency band, two transmitting channels may compete for the same transmitting antenna, resulting in a conflict between the LTE frequency band and the NR frequency band in the process of switching the transmitting antenna, thereby affecting the communication quality.

Figure 1:
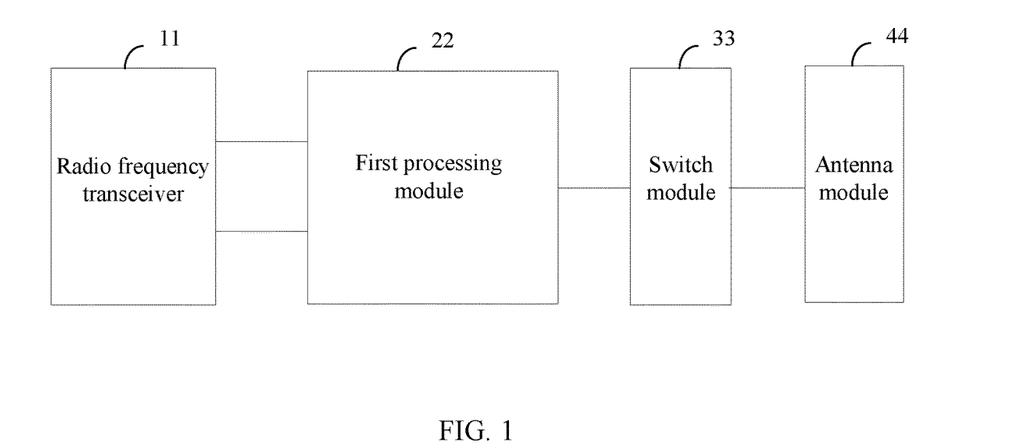
FIG. 1 is a first flowchart of a radio frequency circuit according to an embodiment of the present disclosure.

Referring to FIG. 1, FIG. 1 is a schematic diagram of a radio frequency circuit according to an embodiment of the present disclosure. As shown in FIG. 1, this embodiment provides a radio frequency circuit, including: a radio frequency front-end module, a switch module 33 and an antenna module 44, wherein
  the radio frequency front-end module includes: a radio frequency transceiver 11, and a first processing module 22 connected to the radio frequency transceiver 11;
  the antenna module 44 includes: an antenna for receiving or transmitting a radio frequency signal;

a first terminal of the radio frequency transceiver 11 is connected to a first terminal of the first processing module 22, and a second terminal of the radio frequency transceiver 11 is connected to a second terminal of the first processing module 22;

a third terminal of the first processing module 22 is connected to a first terminal of the switch module 33;

a second terminal of the switch module 33 is connected to the antenna module 44;

the first terminal of the radio frequency transceiver 11 is configured to transmit a signal of a first network;

the second terminal of the radio frequency transceiver 11 is configured to transmit a signal of a second network; and the first processing module 22 is configured to transmit the signal of the first network and the signal of the second network.

For example, the antenna module 44 includes one or a plurality of antennas for receiving or transmitting a radio frequency signal. By adjusting the switch module 33, the first processing module 22 may communicate with a target antenna (the target antenna may be any antenna in the antenna module 44) in the antenna module 44. In this embodiment, the radio frequency circuit is applied to a non-standalone mode, in a case that the first network and the second network compete for the same transmitting antenna when switching the transmitting antenna, the first processing module 22 may transmit the signal of the first network and the signal of the second network through the same transmitting antenna, so as to avoid the deterioration of the communication quality caused by the use conflict of the transmitting antenna in the process of the switching the transmitting antenna by the first network and the second network, thereby improving the communication quality.

The first processing module 22 is further configured to receive the signal of the first network and/or the signal of the second network, that is, the first processing module 22 may also receive the signal of the first network, or receive the signal of the second network, or receive the signals of the first network and the second network at the same time.

The first network may be an NR network, the second network may be an LTE network, or the first network may be an LTE network and the second network may be an NR network. In a case that the NR network and the LTE network compete for the same transmitting antenna when switching the transmitting antenna, the signal of the NR network and the signal of the LTE network may be transmitted by the radio frequency circuit through the same transmitting antenna. For example, when there is a use conflict of the transmitting antenna between the transmitting antenna switching of the LTE network and the SRS antenna switching of the NR network, the radio frequency circuit in this embodiment may be used for avoiding deterioration of the communication quality caused by the use conflict of the transmitting antenna in the process of switching the transmitting antenna by the LTE network and the NR network, thereby improving the communication quality.

Figure 2:
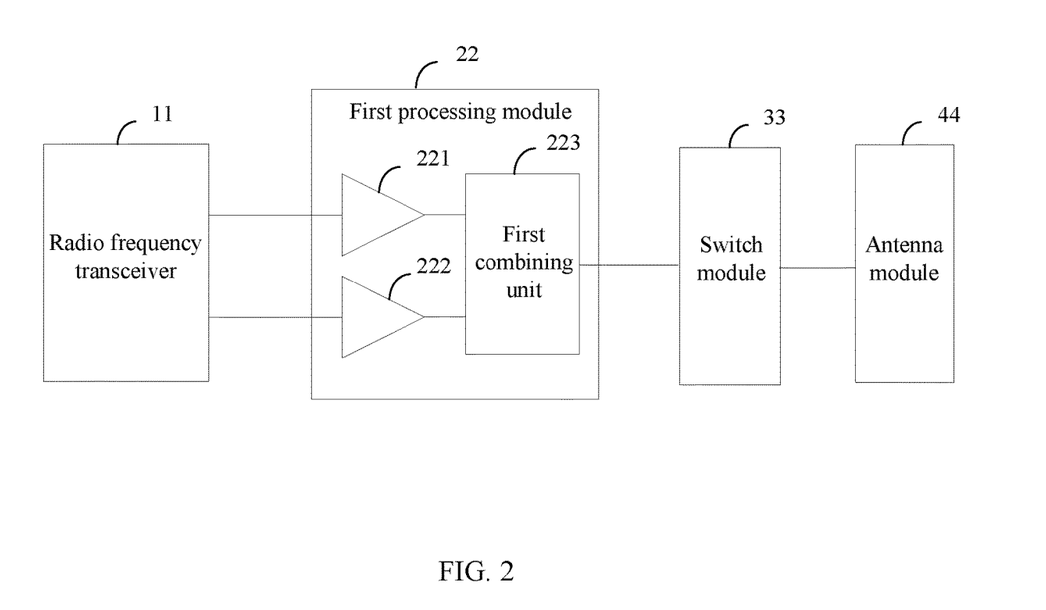
FIG. 2 is a second flowchart of a radio frequency circuit according to an embodiment of the present disclosure.

As shown in FIG. 2, in one embodiment of the present disclosure, the embodiment of the present disclosure provides an implementation manner of a first processing module 22. The first processing module 22 includes: a first power amplifier 221, a second power amplifier 222 and a first combining unit 223;

an input terminal of the first power amplifier 221 is connected to the first terminal of the radio frequency transceiver 11, and an output terminal of the first power amplifier 221 is connected to a first terminal of the first combining unit 223;

an input terminal of the second power amplifier 222 is connected to the second terminal of the radio frequency transceiver 11, and an output terminal of the second power amplifier 222 is connected to a second terminal of the first combining unit 223; and a third terminal of the first combining unit 223 is connected to a first terminal of the switch module 33.

For example, the first combining unit 223 may be a combiner or a multichannel switch and is configured to combine a transmitting signal of the first network and a transmitting signal of the second network.

In this embodiment, the signal of the first network is input at the input terminal of the first power amplifier 221, the signal of the second network is input at the input terminal of the second power amplifier 222, and then the signal of the first network (that is, the transmitting signal of the first network) and the signal of the second network (that is, the transmitting signal of the second network) are combined through the first combining unit 223 to be output through the target antenna in the antenna module 44, so that the signal of the first network and the signal of the second network may be transmitted through the target antenna at the same time to avoid the deterioration of the communication quality caused by the use conflict of the antenna in the process of switching the transmitting antenna by the first network and the second network, thereby improving the communication quality.

Figure 3:
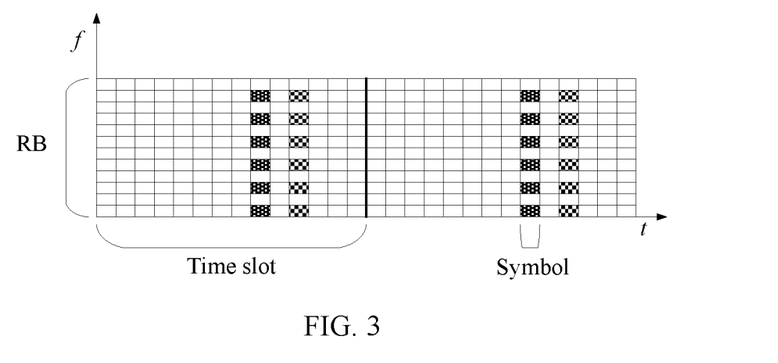
FIG. 3 is a time-frequency structural schematic diagram of sounding reference signal (SRS) antenna switching performed by a second network.

According to the 3GPP definition, the SRS signal of the NR frequency band (that is, the NR network) is only transmitted in a specific symbol of a specific time slot. Taking a 30 KHz sub-carrier spacing of the NR network as an example, as shown in FIG. 3, and one sub-frame includes 2 time slots, one time slot includes 14 symbols, wherein the time of one sub-frame is 1 ms, that is, the time of 1 symbol is about 35.7 μs; and when SRS antenna switching is performed on the NR network, the transmitted SRS signals are at most transmitted in the last 6 symbols of the time slot.

When the NR frequency band performs SRS antenna switching and needs to share the transmitting antenna with the LTE frequency band (that is, the LTE network), the NR frequency band may use the same transmitting antenna as that used by the LTE frequency band through the first processing module 22 so as to avoid the deterioration of the communication quality caused by the use conflict of the antenna in the process of switching the transmitting antenna at the LTE frequency band and the NR frequency band, thereby improving the communication quality.

During the time slot or symbol period of performing SRS antenna switching by the second network, it is necessary to switch the transmitting antenna, which may switch the transmitting antenna to the transmitting antenna being used by the first network, in this case, the antenna use conflict is most likely to occur. At this time, during the time slot or symbol period of performing SRS antenna switching by the second network, the first combining unit 223 is adjusted, so that the first terminal of the first combining unit 223 and the second terminal of the first combining unit 223 communicate with a target antenna in the antenna module 44 for transmitting the signal of the first network and the signal of the second network.

In this embodiment, during the time slot or symbol period of performing SRS antenna switching by the second network, the first combining unit 223 is adjusted, so that the first terminal of the first combining unit 223 and the second terminal of the first combining unit 223 communicate with the target antenna in the switch module 44. Therefore, the signal of the first network may be transmitted through the target antenna, and the signal of the second network may also be transmitted through the target antenna at the same time, so as to avoid the deterioration of the communication quality caused by the use conflict of the transmitting antenna in the process of the switching the transmitting antenna by the first network and the second network, thereby improving the communication quality.

Figure 4:
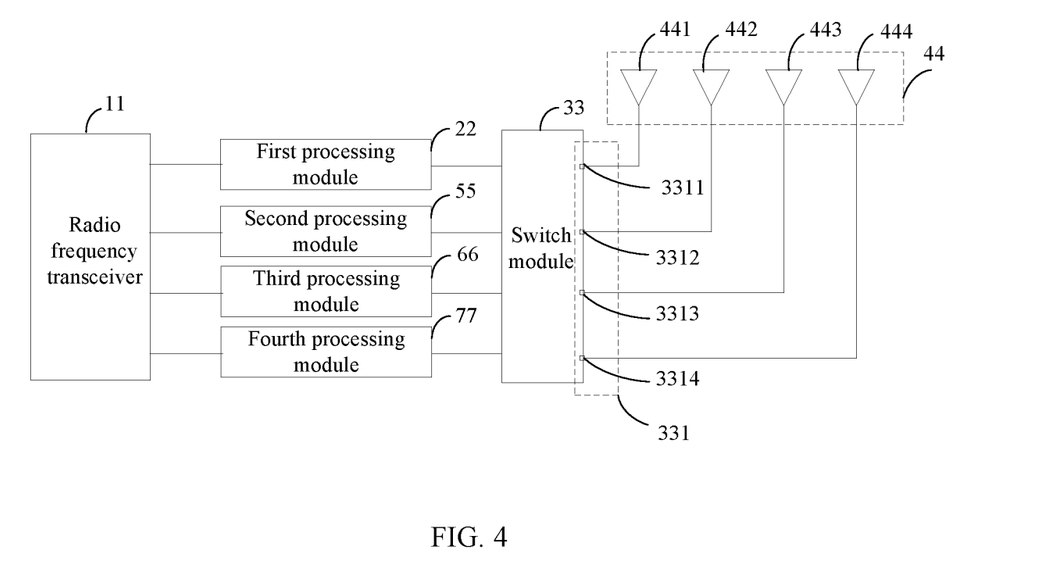
FIG. 4 is a third flowchart of a radio frequency circuit according to an embodiment of the present disclosure.

As shown in FIG. 4, in one embodiment of the present disclosure, the radio frequency front-end module further includes a second processing module 55, a third processing module 66 and a fourth processing module 77;

the antenna module 44 includes: a first antenna 441, a second antenna 442, a third antenna 443 and a fourth antenna 444 for receiving or transmitting a radio frequency signal;

a second terminal of the switch module 33 includes a first sub-terminal 3311, a second sub-terminal 3312, a third sub-terminal 3313 and a fourth sub-terminal 3314;

a first terminal of the second processing module 55 is connected to a third terminal of the radio frequency transceiver 11, and a second terminal of the second processing module 55 is connected to a third terminal of the switch module 33;

a first terminal of the third processing module 66 is connected to a fourth terminal of the radio frequency transceiver 11, and a second terminal of the third processing module 66 is connected to a fourth terminal of the switch module 33;

a first terminal of the fourth processing module 77 is connected to a fifth terminal of the radio frequency transceiver 11, and a second terminal of the fourth processing module 77 is connected to a fifth terminal of the switch module 33;

the first sub-terminal 3311 of the switch module 33 is connected to the first antenna 441;

the second sub-terminal 3312 of the switch module 33 is connected to the second antenna 442;

the third sub-terminal 3313 of the switch module 33 is connected to the third antenna 443;

the fourth sub-terminal 3314 of the switch module 33 is connected to the fourth antenna 444;

the second processing module 55 is configured to receive a signal of a first network and/or a signal of a second network;

the third processing module 66 is configured to receive at least one of the signal of the first network or the signal of the second network, or is configured to receive the signal of the first network and transmit the signal of the second network, or is configured to transmit the signal of the second network.

The fourth processing module 77 is configured to receive the signal of the first network and/or the signal of the second network.

In FIG. 4, the reference numeral 331 shows the second terminal of the switch module 33. The first processing module 22 corresponds to: an LTE/NR receiving and transmitting module; the second processing module 55 corresponds to: a first LTE/NR receiving module (LTE/NR receiving module #1); the third processing module 66 corresponds to: an LTE receiving/NR receiving and transmitting module; and a fourth processing module 77 corresponds to: a second LTE/NR receiving module (LTE/NR receiving module #2).

The switch module 33 has four paths of input and four paths of output, wherein the input terminal is connected to the LTE/NR receiving and transmitting module, the first LTE/NR receiving module, the LTE receiving/NR receiving and transmitting module and the second LTE/NR receiving module respectively; and the LTE/NR receiving and transmitting module, the first LTE/NR receiving module, the LTE receiving/NR receiving and transmitting module and the second LTE/NR receiving module may be connected to ANT0 (that is, the first antenna 441), ANT1 (that is, the second antenna 442), ANT2 (that is, the third antenna 443) and ANT3 (that is, the fourth antenna 444) respectively through the switch module 33. In this way, any processing module may be connected to any antenna in the antenna module 44 through the switch module 33 so as to transmit or receive the signal.

Figure 5:
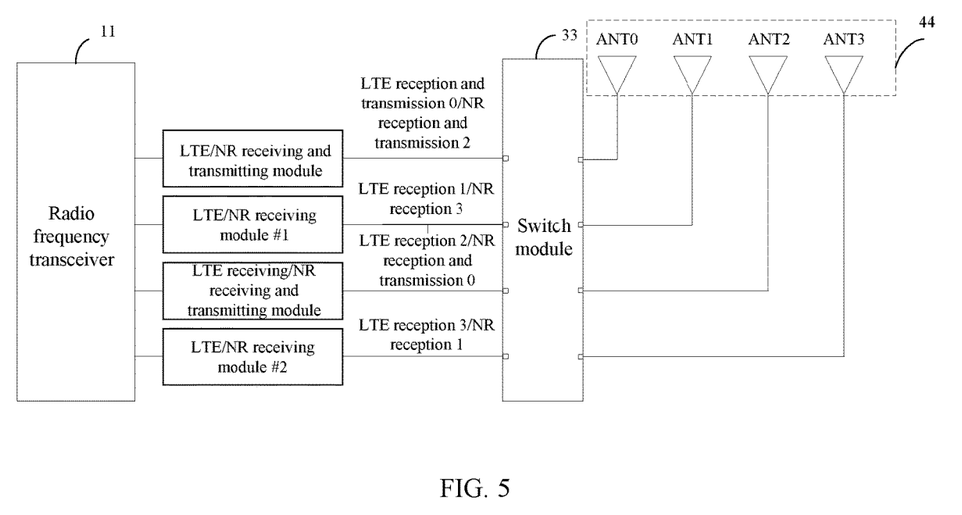
FIG. 5 is a fourth flowchart of a radio frequency circuit according to an embodiment of the present disclosure.

As shown in FIG. 5, ANT0 is connected to LTE reception and transmission 0 and NR reception 2 respectively; ANT1 is connected to LTE reception 1 and NR reception 3 respectively; ANT2 is connected to LTE reception 2 and NR reception and transmission 0 respectively; and ANT3 is connected to LTE reception 4 and NR reception 1 respectively.

The LTE reception and transmission 0, the LTE reception 1, the LTE reception 2 and the LTE reception 3 may be understood as channel numbers of the LTE, wherein each number represents one path of the LTE. The NR reception and transmission 0, the NR reception 1, the NR reception and transmission 2 and the NR reception 3 may be understood as channel numbers of the NR, wherein each number represents one channel of the NR.

When NR does not preform SRS antenna switching in the LTE standalone mode, NR standalone mode or LTE-NR double-connection mode, the LTE network and the NR network will not compete for the antenna resources. At this time, the LTE network and the NR network use different antennas respectively for transmission. At this time, the LTE/NR receiving and transmitting module is only used for reception and transmission of the LTE network and reception of the NR network, but not for transmission of the NR network.

When the NR network performs SRS antenna switching, it is necessary to switch the transmitting antenna. At this time, the NR network may switch the transmitting antenna to the transmitting antenna being used by the LTE network. In this case, the antenna use conflict may occur, and it is necessary to adjust the first combining unit 223, so that the first processing module 22 may be configured to transmit a signal of the NR network and a signal of the LTE network at the same time so as to avoid deterioration of the communication quality caused by the use conflict of the transmitting antenna in the process of switching the transmitting antenna by the NR network and the LTE network, thereby improving the communication quality.

Figure 6:
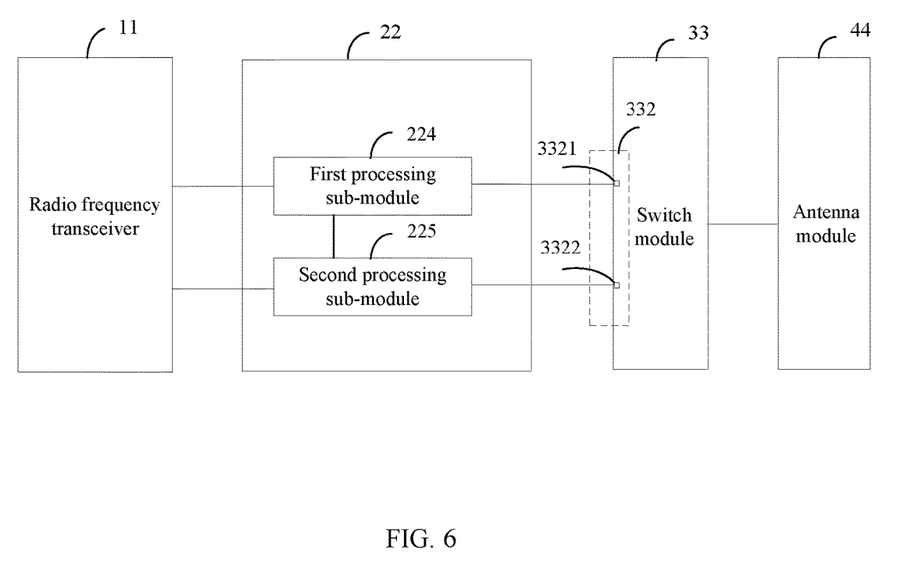
FIG. 6 is a fifth flowchart of a radio frequency circuit according to an embodiment of the present disclosure.

The embodiment of the present disclosure further provides an implementation manner of a first processing module 22. As shown in FIG. 6, the first processing module 22 includes a first processing sub-module 224 and a second processing sub-module 225;

a first terminal of the switch module 33 includes a fifth sub-terminal 3321 and a sixth sub-terminal 3322;

a first terminal of the radio frequency transceiver 11 is connected to a first terminal of the first processing sub-module 224, and a second terminal of the radio frequency transceiver 11 is connected to a first terminal of the second processing sub-module 225;

a second terminal of the first processing sub-module 224 is connected to the fifth sub-terminal 3321;

a second terminal of the second processing sub-module 225 is connected to the sixth sub-terminal 3322;

a third terminal of the first processing sub-module 224 is connected to a third terminal of the second processing sub-module 225;

the first processing sub-module 224 is configured to transmit a signal of a first network and/or a signal of a second network; and the second processing sub-module 225 is configured to receive at least one of the signal of the first network or the signal of the second network, or is configured to receive the signal of the first network and transmit the signal of the second network, or is configured to transmit the signal of the second network.

In this embodiment, in FIG. 6, the reference numeral 332 shows a first terminal of the switch module 33. The first processing module 22 includes a first processing sub-module 224 and a second processing sub-module 225. The first processing sub-module 224 and the second processing sub-module 225 may be connected to different antennas through the switch module 33. The first processing sub-module 224 is further configured to receive a signal of a first network and/or a signal of a second network.

In this embodiment, in a case that the first network and the second network compete for the same transmitting antenna when switching the transmitting antenna, the first processing module 22 may transmit the signal of the first network and the signal of the second network through the same transmitting antenna, so as to avoid the deterioration of the communication quality caused by the use conflict of the transmitting antenna in the process of the switching the transmitting antenna by the first network and the second network, thereby improving the communication quality.

Figure 7:
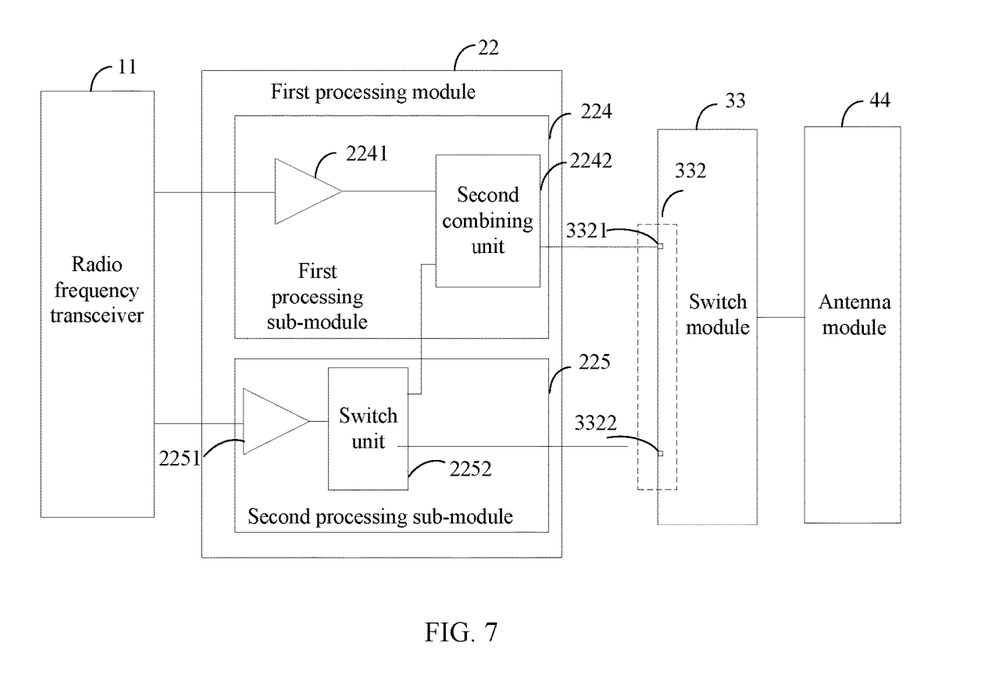
FIG. 7 is a sixth flowchart of a radio frequency circuit according to an embodiment of the present disclosure.

As shown in FIG. 7, the first processing sub-module 224 includes: a third power amplifier 2241 and a second combining unit 2242;

the second processing sub-module 225 includes: a fourth power amplifier 2251 and a switch unit 2252;

an input terminal of the third power amplifier 2241 is connected to a first terminal of the radio frequency transceiver 11, and an output terminal of the third power amplifier 2241 is connected to a first terminal of the second combining unit 2242;

an input terminal of the fourth power amplifier 2251 is connected to a second terminal of the radio frequency transceiver 11, and an output terminal of the fourth power amplifier 2251 is connected to a first terminal of the switch unit 2252;

a second terminal of the second combining unit 2242 is connected to a second terminal of the switch unit 2252;

a third terminal of the second combining unit 2242 is connected to the fifth sub-terminal 3321; and a third terminal of the switch unit 2252 is connected to the sixth sub-terminal 3322.

For example, the third terminal of the switch unit 2252 is connected to the third terminal of the second combining unit 2242, so that the second terminal of the fourth power amplifier 2251 may be connected to the third terminal of the second combining unit 2242 by adjusting the switch unit 2252. The signal of the first network is input at the input terminal of the third power amplifier 2241, the signal of the second network is input at the input terminal of the fourth power amplifier 2251, and then the signal of the first network (that is, the transmitting signal of the first network) and the signal of the second network (that is, the transmitting signal of the second network) are combined through the first combining unit 223 to be output through the target antenna in the antenna module 44, so that the signal of the first network and the signal of the second network may be transmitted through the target antenna at the same time to avoid the deterioration of the communication quality caused by the use conflict of the antenna in the process of switching the transmitting antenna by the first network and the second network, thereby improving the communication quality.

During the time slot or symbol period of performing SRS antenna switching by the second network, it is necessary to switch the transmitting antenna, which may switch the transmitting antenna to the transmitting antenna being used by the first network, in this case, the antenna use conflict is most likely to occur. At this time, during the time slot or symbol period of performing SRS antenna switching by the second network, the switch unit 2252 and the second combining unit 2242 are adjusted, so that the first processing sub-module 224 and the second processing sub-module 225 communicate with a target antenna in the antenna module 44 for transmitting the signal of the first network and the signal of the second network.

In this embodiment, during the time slot or symbol period of performing SRS antenna switching by the second network, the switch unit 2252 and the second combining unit 2242 are adjusted, so that the first processing sub-module 224 and the second processing sub-module 225 communicate with the target antenna in the switch module 44. Therefore, the signal of the first network may be transmitted through the target antenna, and the signal of the second network may also be transmitted through the target antenna at the same time, so as to avoid the deterioration of the communication quality caused by the use conflict of the transmitting antenna in the process of the switching the transmitting antenna by the first network and the second network, thereby improving the communication quality.

Figure 8:
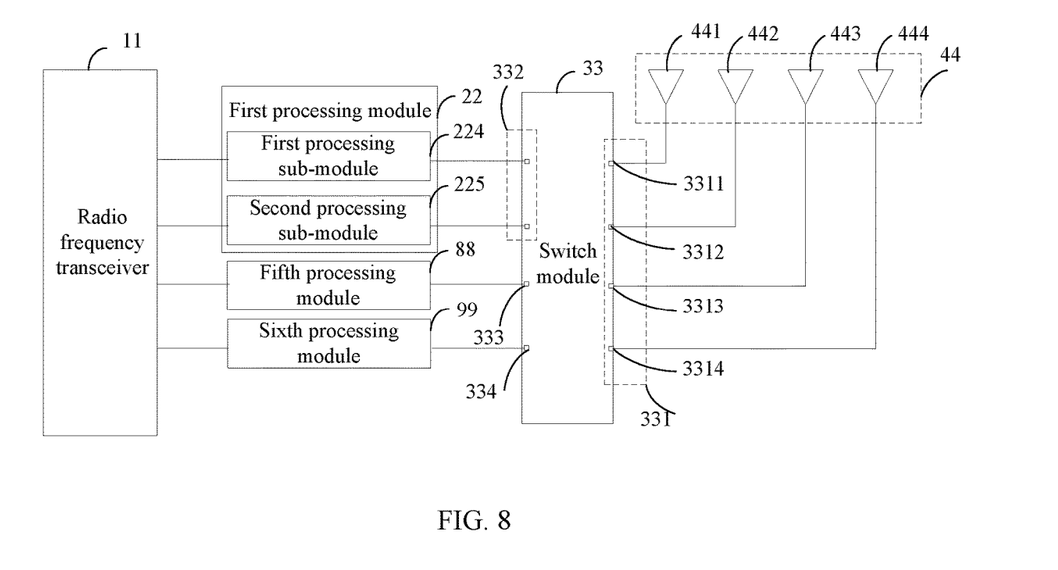
FIG. 8 is a seventh flowchart of a radio frequency circuit according to an embodiment of the present disclosure.

As shown in FIG. 8, in one embodiment of the present disclosure, the radio frequency front-end module further includes a fifth processing module 88 and a sixth processing module 99;

the antenna module 44 includes: a first antenna 441, a second antenna 442, a third antenna 443 and a fourth antenna 444 for receiving or transmitting a radio frequency signal;

a second terminal of the switch module 33 includes a first sub-terminal 3311, a second sub-terminal 3312, a third sub-terminal 3313 and a fourth sub-terminal 3314;

a first terminal of the fifth processing module 88 is connected to a sixth terminal of the radio frequency transceiver 11, and a second terminal of the fifth processing module 88 is connected to a third terminal of the switch module 33;

a first terminal of the sixth processing module 99 is connected to a seventh terminal of the radio frequency transceiver 11, and a second terminal of the sixth processing module 99 is connected to a fourth terminal of the switch module 33;

the first sub-terminal 3311 of the switch module 33 is connected to the first antenna 441;

the second sub-terminal 3312 of the switch module 33 is connected to the second antenna 442;

the third sub-terminal 3313 of the switch module 33 is connected to the third antenna 443;

the fourth sub-terminal 3314 of the switch module 33 is connected to the fourth antenna 444;

the fifth processing module 88 is configured to receive the signal of the first network and/or the signal of the second network; and the sixth processing module 99 is configured to receive the signal of the first network and/or the signal of the second network.

The first processing sub-module 224 corresponds to: an LTE/NR receiving and transmitting module; the second processing sub-module 225 corresponds to: an LTE receiving/NR receiving and transmitting module; the fifth processing module 88 corresponds to: a first LTE/NR receiving module (LTE/NR receiving module #1); and the second processing module 99 corresponds to: a second LTE/NR receiving module (LTE/NR receiving module #2). This may be referenced to the structure shown in FIG. 5.

The switch module 33 has four paths of input and four paths of output, wherein the input terminal is connected to the LTE/NR receiving and transmitting module, the first LTE/NR receiving module, the LTE receiving/NR receiving and transmitting module and the second LTE/NR receiving module respectively; and the LTE/NR receiving and transmitting module, the first LTE/NR receiving module, the LTE receiving/NR receiving and transmitting module and the second LTE/NR receiving module may be connected to ANT0 (that is, the first antenna 441), ANT1 (that is, the second antenna 442), ANT2 (that is, the third antenna 443) and ANT3 (that is, the fourth antenna 444) respectively through the switch module 33. In this way, any processing module (or processing sub-module) may be connected to any antenna in the antenna module 44 through the switch module 33 so as to transmit or receive the signal.

As shown in FIG. 5, ANT0 is connected to LTE reception and transmission 0 and NR reception 2 respectively; ANT1 is connected to LTE reception 1 and NR reception 3 respectively; ANT2 is connected to LTE reception 2 and NR reception and transmission 0 respectively; and ANT3 is connected to LTE reception 4 and NR reception 1 respectively.

The LTE reception and transmission 0, the LTE reception 1, the LTE reception 2 and the LTE reception 3 may be understood as channel numbers of the LTE, wherein each number represents one path of the LTE. The NR reception and transmission 0, the NR reception 1, the NR reception and transmission 2 and the NR reception 3 may be understood as channel numbers of the NR, wherein each number represents one channel of the NR.

When NR does not preform SRS antenna switching in the LTE standalone mode, NR standalone mode or LTE-NR double-connection mode, the LTE network and the NR network will not compete for the antenna resources. At this time, the LTE network and the NR network use different antennas respectively for transmission. At this time, the LTE/NR receiving and transmitting module is only used for reception and transmission of the LTE network and reception of the NR network, but not for transmission of the NR network.

When the NR network performs SRS antenna switching, it is necessary to switch the transmitting antenna. At this time, the NR network may switch the transmitting antenna to the transmitting antenna being used by the LTE network. In this case, the antenna use conflict may occur, and it is necessary to adjust the switch unit 2252 and the second combining unit 2242, so that the first processing sub-module 224 and the second processing sub-module 225 communicate with the target antenna in the antenna module 44. In this way, the signal of the first network may be transmitted by the target antenna, and the signal of the second network may also be transmitted by the target antenna at the same time, so as to avoid deterioration of the communication quality caused by the use conflict of the transmitting antenna in the process of switching the transmitting antenna by the first network and the second network, thereby improving the communication quality.

In the embodiments of the present disclosure, the radio frequency circuit may be applied to a terminal device, such as a mobile phone, a tablet personal computer, a laptop computer, a personal digital assistant (PDA), a mobile Internet device (MID) or a wearable device.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. An element limited by "includes a . . . " does not, without more constraints, preclude the presence of additional identical elements in the process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing implementations. The foregoing implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A radio frequency circuit, comprising a radio frequency front-end module, a switch module, and an antenna module, wherein the radio frequency front-end module comprises a radio frequency transceiver and a first processing module connected to the radio frequency transceiver;

the antenna module comprises an antenna for receiving or transmitting a radio frequency signal;

a first terminal of the radio frequency transceiver is connected to a first terminal of the first processing module, and a second terminal of the radio frequency transceiver is connected to a second terminal of the first processing module;

a third terminal of the first processing module is connected to a first terminal of the switch module;

a second terminal of the switch module is connected to the antenna module;

the first terminal of the radio frequency transceiver is configured to transmit a signal of a first network;

the second terminal of the radio frequency transceiver is configured to transmit a signal of a second network; and the first processing module is configured to transmit the signal of the first network and the signal of the second network; wherein the first processing module comprises a first processing sub-module and a second processing sub-module;

the first terminal of the switch module comprises a fifth sub-terminal and a sixth sub-terminal;

the first terminal of the radio frequency transceiver is connected to a first terminal of the first processing sub-module, and the second terminal of the radio frequency transceiver is connected to a first terminal of the second processing sub-module;

a second terminal of the first processing sub-module is connected to the fifth sub-terminal;

a second terminal of the second processing sub-module is connected to the sixth sub-terminal;

a third terminal of the first processing sub-module is connected to a third terminal of the second processing sub-module;

the first processing sub-module is configured to transmit the signal of the first network and/or the signal of the second network; and the second processing sub-module is configured to receive at least one of the signal of the first network or the signal of the second network, or is configured to receive the signal of the first network and transmit the signal of the second network, or is configured to transmit the signal of the second network.

2. The radio frequency circuit according to claim 1, wherein the radio frequency front-end module further comprises a second processing module, a third processing module and a fourth processing module;

the antenna module comprises a first antenna, a second antenna, a third antenna and a fourth antenna for receiving or transmitting a radio frequency signal;

the second terminal of the switch module comprises a first sub-terminal, a second sub-terminal, a third sub-terminal and a fourth sub-terminal;

a first terminal of the second processing module is connected to a third terminal of the radio frequency transceiver, and a second terminal of the second processing module is connected to a third terminal of the switch module;

a first terminal of the third processing module is connected to a fourth terminal of the radio transceiver, and a second terminal of the third processing module is connected to a fourth terminal of the switch module;

a first terminal of the fourth processing module is connected to a fifth terminal of the radio frequency transceiver, and a second terminal of the fourth processing module is connected to a fifth terminal of the switch module;

the first sub-terminal of the switch module is connected to the first antenna;

the second sub-terminal of the switch module is connected to the second antenna;

the third sub-terminal of the switch module is connected to the third antenna;

the fourth sub-terminal of the switch module is connected to the fourth antenna;

the second processing module is configured to receive the signal of the first network and/or the signal of the second network;

the third processing module is configured to receive at least one of the signal of the first network or the signal of the second network, or is configured to receive the signal of the first network and transmit the signal of the second network, or is configured to transmit the signal of the second network; and the fourth processing module is configured to receive the signal of the first network and/or the signal of the second network.

3. The radio frequency circuit according to claim 1, wherein the first processing sub-module comprises a third power amplifier and a second combining unit;

the second processing sub-module comprises a fourth power amplifier and a switch unit;

an input terminal of the third power amplifier is connected to the first terminal of the radio frequency transceiver, and an output terminal of the third power amplifier is connected to a first terminal of the second combining unit;

an input terminal of the fourth power amplifier is connected to the second terminal of the radio frequency transceiver, and an output terminal of the fourth power amplifier is connected to a first terminal of the switch unit;

a second terminal of the second combining unit is connected to a second terminal of the switch unit;

a third terminal of the second combining unit is connected to the fifth sub-terminal; and a third terminal of the switch unit is connected to the sixth sub-terminal.

4. The radio frequency circuit according to claim 3, wherein during a time slot or symbol period of performing sounding reference signal (SRS) antenna switching by the second network, the switch unit and the second combining unit are adjusted, so that the first processing sub-module and the second processing sub-module communicate with a target antenna in the antenna module for transmitting the signal of the first network and the signal of the second network.

5. The radio frequency circuit according to claim 1, wherein the radio frequency front-end module further comprises a fifth processing module and a sixth processing module;

the antenna module comprises a first antenna, a second antenna, a third antenna and a fourth antenna for receiving or transmitting a radio frequency signal;

the second terminal of the switch module comprises a first sub-terminal, a second sub-terminal, a third sub-terminal and a fourth sub-terminal;

a first terminal of the fifth processing module is connected to a sixth terminal of the radio frequency transceiver, and a second terminal of the fifth processing module is connected to a third terminal of the switch module;

a first terminal of the sixth processing module is connected to a seventh terminal of the radio frequency transceiver, and a second terminal of the sixth processing module is connected to a fourth terminal of the switch module;

the first sub-terminal of the switch module is connected to the first antenna;

the second sub-terminal of the switch module is connected to the second antenna;

the third sub-terminal of the switch module is connected to the third antenna;

the fourth sub-terminal of the switch module is connected to the fourth antenna;

the fifth processing module is configured to receive the signal of the first network and/or the signal of the second network; and the sixth processing module is configured to receive the signal of the first network and/or the signal of the second network.

6. A terminal device, comprising a radio frequency circuit, wherein the radio frequency circuit comprises a radio frequency front-end module, a switch module, and an antenna module;

the radio frequency front-end module comprises a radio frequency transceiver and a first processing module connected to the radio frequency transceiver;

the antenna module comprises an antenna for receiving or transmitting a radio frequency signal;

a first terminal of the radio frequency transceiver is connected to a first terminal of the first processing module, and a second terminal of the radio frequency transceiver is connected to a second terminal of the first processing module;

a third terminal of the first processing module is connected to a first terminal of the switch module;

a second terminal of the switch module is connected to the antenna module;

the first terminal of the radio frequency transceiver is configured to transmit a signal of a first network;

the second terminal of the radio frequency transceiver is configured to transmit a signal of a second network; and the first processing module is configured to transmit the signal of the first network and the signal of the second network; wherein the first processing module comprises a first processing sub-module and a second processing sub-module;

the first terminal of the switch module comprises a fifth sub-terminal and a sixth sub-terminal;

the first terminal of the radio frequency transceiver is connected to a first terminal of the first processing sub-module, and the second terminal of the radio frequency transceiver is connected to a first terminal of the second processing sub-module;

a second terminal of the first processing sub-module is connected to the fifth sub-terminal;

a second terminal of the second processing sub-module is connected to the sixth sub-terminal;

a third terminal of the first processing sub-module is connected to a third terminal of the second processing sub-module;

the first processing sub-module is configured to transmit the signal of the first network and/or the signal of the second network; and the second processing sub-module is configured to receive at least one of the signal of the first network or the signal of the second network, or is configured to receive the signal of the first network and transmit the signal of the second network, or is configured to transmit the signal of the second network.

7. The terminal device according to claim 6, wherein the radio frequency front-end module further comprises a second processing module, a third processing module and a fourth processing module;

the antenna module comprises a first antenna, a second antenna, a third antenna and a fourth antenna for receiving or transmitting a radio frequency signal;

the second terminal of the switch module comprises a first sub-terminal, a second sub-terminal, a third sub-terminal and a fourth sub-terminal;

a first terminal of the second processing module is connected to a third terminal of the radio frequency transceiver, and a second terminal of the second processing module is connected to a third terminal of the switch module;

a first terminal of the third processing module is connected to a fourth terminal of the transceiver, and a second terminal of the third processing module is connected to a fourth terminal of the switch module;

a first terminal of the fourth processing module is connected to a fifth terminal of the radio frequency transceiver, and a second terminal of the fourth processing module is connected to a fifth terminal of the switch module;

the first sub-terminal of the switch module is connected to the first antenna;

the second sub-terminal of the switch module is connected to the second antenna;

the third sub-terminal of the switch module is connected to the third antenna;

the fourth sub-terminal of the switch module is connected to the fourth antenna;

the second processing module is configured to receive the signal of the first network and/or the signal of the second network;

the third processing module is configured to receive at least one of the signal of the first network or the signal of the second network, or is configured to receive the signal of the first network and transmit the signal of the second network, or is configured to transmit the signal of the second network; and the fourth processing module is configured to receive the signal of the first network and/or the signal of the second network.

8. The terminal device according to claim 6, wherein the first processing sub-module comprises a third power amplifier and a second combining unit;

the second processing sub-module comprises a fourth power amplifier and a switch unit;

an input terminal of the third power amplifier is connected to the first terminal of the radio frequency transceiver, and an output terminal of the third power amplifier is connected to a first terminal of the second combining unit;

an input terminal of the fourth power amplifier is connected to the second terminal of the radio frequency transceiver, and an output terminal of the fourth power amplifier is connected to a first terminal of the switch unit;

a second terminal of the second combining unit is connected to a second terminal of the switch unit;

a third terminal of the second combining unit is connected to the fifth sub-terminal; and a third terminal of the switch unit is connected to the sixth sub-terminal.

9. The terminal device according to claim 8, wherein during a time slot or symbol period of performing sounding reference signal (SRS) antenna switching by the second network, the switch unit and the second combining unit are adjusted, so that the first processing sub-module and the second processing sub-module communicate with a target antenna in the antenna module for transmitting the signal of the first network and the signal of the second network.

10. The terminal device according to claim 6, wherein the radio frequency front-end module further comprises a fifth processing module and a sixth processing module;

the antenna module comprises a first antenna, a second antenna, a third antenna and a fourth antenna for receiving or transmitting a radio frequency signal;

the second terminal of the switch module comprises a first sub-terminal, a second sub-terminal, a third sub-terminal and a fourth sub-terminal;

a first terminal of the fifth processing module is connected to a sixth terminal of the radio frequency transceiver, and a second terminal of the fifth processing module is connected to a third terminal of the switch module;

a first terminal of the sixth processing module is connected to a seventh terminal of the radio frequency transceiver, and a second terminal of the sixth processing module is connected to a fourth terminal of the switch module;

the first sub-terminal of the switch module is connected to the first antenna;

the second sub-terminal of the switch module is connected to the second antenna;

the third sub-terminal of the switch module is connected to the third antenna;

the fourth sub-terminal of the switch module is connected to the fourth antenna;

the fifth processing module is configured to receive the signal of the first network and/or the signal of the second network; and the sixth processing module is configured to receive the signal of the first network and/or the signal of the second network.

* * * * *